US009792545B1

(12) United States Patent
Sherman et al.

(10) Patent No.: US 9,792,545 B1
(45) Date of Patent: Oct. 17, 2017

(54) VENDOR-BASED INVENTORY MANAGEMENT SYSTEM AND METHOD

(76) Inventors: Abe P. Sherman, South Lake Tahoe, CA (US); Mark I. Wolfson, Cherry Hill, NJ (US); Ellen Falcinelli, Napa, CA (US)

( * ) Notice: Subject to any disclaimer, the term of this patent is extended or adjusted under 35 U.S.C. 154(b) by 1954 days.

(21) Appl. No.: 12/775,629

(22) Filed: May 7, 2010

Related U.S. Application Data

(60) Provisional application No. 61/176,580, filed on May 8, 2009.

(51) Int. Cl.
G06Q 10/00 (2012.01)
G06K 15/00 (2006.01)
G06F 17/00 (2006.01)
G06M 7/02 (2006.01)
G06Q 30/00 (2012.01)

(52) U.S. Cl.
CPC .............. *G06M 7/02* (2013.01); *G06Q 30/00* (2013.01)

(58) Field of Classification Search
USPC .......................................................... 705/28
See application file for complete search history.

(56) References Cited

U.S. PATENT DOCUMENTS

| | | | |
|---|---|---|---|
| 5,712,985 A | 1/1998 | Lee et al. | |
| 5,953,707 A | 9/1999 | Huang et al. | |
| 6,029,139 A | 2/2000 | Cunningham et al. | |
| 6,078,891 A | 6/2000 | Riordan et al. | |
| 6,366,890 B1 | 4/2002 | Usrey | |
| 6,553,352 B2 | 4/2003 | Delurgio et al. | |
| 6,611,839 B1 | 8/2003 | Nwabueze | |
| 6,633,851 B1 | 10/2003 | Engler et al. | |
| 6,851,604 B2 | 2/2005 | Girotto et al. | |
| 6,898,599 B2 | 5/2005 | Young et al. | |
| 6,910,017 B1 | 6/2005 | Woo et al. | |
| 6,929,177 B2 | 8/2005 | Matsko | |
| 7,085,734 B2 | 8/2006 | Grant et al. | |
| 7,171,376 B2 | 1/2007 | Ramakrishnan | |

(Continued)

OTHER PUBLICATIONS http://en.wikipedia.org/wiki/Fishbowl_Inventory.

(Continued)

*Primary Examiner* — Talia Crawley
(74) *Attorney, Agent, or Firm* — Jason P. Webb; Pearson Butler

(57) ABSTRACT

A vendor-based inventory management system configured to facilitate management of retailer inventory associated with a vendor using a computing device. The system includes a communication module in communication with a plurality of remote point-of-sale (POS) systems over a network. The system also includes a data storage module having a memory storage device that stores POS data received. In addition, the system includes an interface module in communication with the data storage module and that reports comparative historical POS data across a plurality of store locations. The system further includes a data analysis module in communication with the data storage module. The data analysis module includes a computing device that analyzes data and suggest beneficial transactions. Furthermore, the system includes a contact management module that manages contact information across a plurality of store locations and associates the same with reported suggested beneficial transactions.

13 Claims, 18 Drawing Sheets

(56) References Cited

U.S. PATENT DOCUMENTS

| | | |
|---|---|---|
| 7,185,002 B1 | 2/2007 | Allen et al. |
| 7,243,841 B1 | 7/2007 | Nelson et al. |
| 7,251,615 B2 | 7/2007 | Woo |
| 2003/0115285 A1 | 6/2003 | Lee et al. |
| 2004/0049465 A1 | 3/2004 | Engler et al. |
| 2004/0098296 A1* | 5/2004 | Bamberg ............ G06Q 10/087 705/7.31 |
| 2004/0181454 A1 | 9/2004 | Manno |
| 2007/0050206 A1* | 3/2007 | Whikehart ............ G06Q 10/04 705/2 |
| 2010/0030668 A1* | 2/2010 | Paben ................ G06Q 30/0283 705/28 |
| 2010/0106609 A1 | 4/2010 | Sherman et al. |

OTHER PUBLICATIONS http://www.x-cart.com/xcart_manual/online/merchandising_and_inventory.htm.
http://www.x-cart.com/xcart_manual/online/sales_analysis_and_tracking.htm.
http://www.x-cart.com/xcart_manual/online/adminstration.htm.
http://www.fishbowlinventoiy.com/wiki/inventoryreports.

* cited by examiner

DATA SETS:
TYPES: DIA PD
VENDORS: ALL

VENDOR:
| SELECT... |
| ALL |
| JEWELER 1 |
| JEWELER 10 |

CATEGORY:
| SELECT... |
| ALL |
| 03-DIA NECK |
| 05-DIA STUDS |

STORE #:
| ALL |
| SELECT... |
| 0 |
| 1 |

START DATE: [ ]  END DATE: [ ]  INVENTORY: AGED INVENTORY ▷

INCLUDE MEMO ▷  SORT1: [ - ▷ ]  SORT2: [ - ▷ ]  SORT3: [ - ▷ ]  [FILTER] [CLEAR]  [SORT]

SOLD - VENDOR STYLE 3FPS01758W (4 TOTAL ITEMS)

| CATEGORY | VENDOR | VENDORSTYLE | S# | S#D | OH | QTY | COST | RETAIL | DATESOLD | DAYS |
|---|---|---|---|---|---|---|---|---|---|---|
| ? DIA PD | JEWELER 14 | 3FPS01758W | 1 | 1 | 0 | 1 | 4,100 | 4,750 | 08/02/08 | 93 |
| ? DIA PD | JEWELER 14 | 3FPS01758W | 1 | 1 | 0 | 1 | 4,100 | 8,000 | 08/02/08 | 93 |
| ? DIA PD | JEWELER 14 | 3FPS01758W | 1 | 1 | 0 | 1 | 4,500 | 9,000 | 08/02/08 | 94 |
| ? DIA PD | JEWELER 2 | 3FPS01758W | 1 | 1 | 0 | 1 | 4,100 | 8,245 | 08/02/08 | 435 |

SOLD - VENDOR STYLE 6PEN00128W (1 TOTAL ITEMS)

| CATEGORY | VENDOR | VENDORSTYLE | S# | S#D | OH | QTY | COST | RETAIL | DATESOLD | DAYS |
|---|---|---|---|---|---|---|---|---|---|---|
| ? DIA PD | JEWELER 14 | 6PEN00128W | 3 | 1 | 1 | 1 | 495 | 740 | 02/13/08 | 957 |

INSTOCK - VENDOR STYLE 3FPS01758W (2 TOTAL ITEMS)

| CATEGORY | VENDOR | VENDORSTYLE | S# | QTY | COST | RETAIL | AGE $ |
|---|---|---|---|---|---|---|---|
| ? DIA PD | JEWELER 14 | 3FPS01758W | 3 | 1 | 3,700 | 10,000 | 907 $ |
| ? DIA PD | JEWELER 31 | 3FPS01758W | 3 | 1 | 3,850 | 10,000 | 434 $ |

INSTOCK - VENDOR STYLE 6PEN00128W (2 TOTAL ITEMS)

| CATEGORY | VENDOR | VENDORSTYLE | S# | QTY | COST | RETAIL | AGE $ |
|---|---|---|---|---|---|---|---|
| ? DIA PD | JEWELER 16 | 6PEN00128W | 1 | 1 | 301 | 900 | 678 $ |
| ? DIA PD | JEWELER 14 | 6PEN00128W | 3 | 1 | 320 | 10,900 | 616 $ |

FIG. 6

CATEGORY:
SELECT ▽    ALL ▽                    SELECT ▽
ALL         SELECT                   ALL           DETAILS|SUMMARY ▷
.40-.65 ROUND   1                    
.90-1.5 FANCY ▽ 2 ▽                  ▽
          STORE #:   PRICE PT: $0.00-$100   VENDOR:
                                $100-$200
                                $200-$300

START DATE          END DATE                    FILTER   CLEAR

PAGE 1 ▷ OF 91 ▷                     PDF ▷

STYLES ANALYSIS REPORT FOR:
DATA SETS:
CATEGORIES: NOT SET, VENDORS: NOT SET, STORE NUMBER: NOT SET

| | | SALES | | | COST OF GOODS | | INVENTORY | | | TURN | PROFIT | | | AGED | | |
|---|---|---|---|---|---|---|---|---|---|---|---|---|---|---|---|---|
| STYLE | DETAIL | COL | AVG DTS | SALES | UNITS | AVG TICKET | COST | AVG COST | COST ONHAND | UNITS | AVG COST OH | OVER | GP$ | GP% | GMROI | COST OF AGED | UNITS | %AGED STOCK | AVG DOH |
| FES01008W | | | 185 | $200,873 | 46 | $4,367 | $90,165 | $1,960 | $68,681 | 35 | $1,962 | 1.31 | $110,709 | 0.55 | 1.61 | $24,940 | 13 | 36% | 350 |
| FPS0508W | | | 165 | $196,645 | 76 | $2,587 | $84,179 | $1,108 | $41,189 | 38 | $1,084 | 2.04 | $112,466 | 0.57 | 2.73 | $13,567 | 13 | 36% | 350 |
| FPS01008W | | | 200 | $194,886 | 31 | $6,287 | $85,969 | $2,773 | $76,039 | 28 | $2,718 | 1.13 | $108,918 | 0.56 | 1.43 | $44,279 | 17 | 36% | 350 |
| SSIE01008W | | | 202 | $175,367 | 29 | $6,047 | $87,762 | $3,036 | $81,964 | 29 | $2,826 | 1.07 | $87,757 | 0.50 | 1.07 | $40,590 | 15 | 36% | 350 |
| FES0508W | | | 149 | $152,691 | 74 | $2,063 | $64,934 | $877 | $30,297 | 34 | $891 | 2.14 | $70,357 | 0.57 | 2.90 | $9,590 | 11 | 36% | 350 |

FIG. 7

CATEGORY:

| SELECT ▽ |   | ALL ▽ |   | $600-$800 ▽ |   |   | SELECT ▽ |
|---|---|---|---|---|---|---|---|
| ALL |   | SELECT |   | $800-$1000 |   |   | ALL |
| .40-.65 ROUND |   | 1 |   | $1000-$1500 |   |   |   |
| .90-1.5 FANCY ▽ | STORE #: | 2 ▽ | PRICE PT: | $1500-$2000 ▽ | VENDOR: |   | DETAILS|SUMMARY ▽ |

START DATE [        ]   END DATE [        ]   [FILTER] [CLEAR]

PAGE 1 ▽ OF 1 ▽                                [PDF ▽]

STYLES ANALYSIS REPORT FOR:
DATA SETS:
CATEGORIES: NOT SET, VENDORS: NOT SET, STORE NUMBER: NOT SET

|  | SALES ||||  | COST OF GOODS || INVENTORY ||| TURN | PROFIT ||| AGED ||||
|---|---|---|---|---|---|---|---|---|---|---|---|---|---|---|---|---|---|
| STYLE | DETAIL COL | AVG DTS | SALES | UNITS | AVG TICKET | COST | AVG COST | COST ONHAND | UNITS | AVG COST OH | OVER | GP$ | GP% | GMROI | COST OF AGED | UNITS | %AGED STOCK | AVG DOH |
| FES00508W |  | 476 | $1,980 | 1 | $1,980 | $840 | $840 | $0 | 0 | $0 | 0.00 | $1,140 | 0.58 | 0.00 | $0 | 0 | 0% | 0 |
| HPPSH800358W |  | 1472 | $1,980 | 1 | $1,980 | $800 | $800 | $0 | 0 | $0 | 0.00 | $1,180 | 0.60 | 0.00 | $0 | 0 | 0% | 0 |
| HDPS200508W |  | 380 | $1,800 | 1 | $1,800 | $900 | $900 | $0 | 0 | $0 | 0.00 | $900 | 0.50 | 0.00 | $0 | 0 | 0% | 0 |
| 3SIE00508W |  | 65 | $1,800 | 1 | $1,800 | $900 | $900 | $0 | 0 | $0 | 0.00 | $900 | 0.50 | 0.00 | $0 | 0 | 0% | 0 |
| HBSSDL00258WC |  | 1706 | $1,755 | 1 | $1,755 | $700 | $700 | $0 | 0 | $0 | 0.00 | $855 | 0.49 | 0.00 | $0 | 0 | 0% | 0 |

FIG. 8

VENDOR: [SELECT ALL ▽] [ALL ▽] STORE #: [SELECT 1 2 ▽] PRICE PT.: [ALL ▽] [DETAILS|SUMMARY ▽]

START DATE [_____] END DATE [_____] [FILTER] [CLEAR]

PAGE [1 ▽] OF [9 ▽] [PDF ▽]

STYLES ANALYSIS REPORT FOR:
DATA SETS:
CATEGORIES: NOT SET, VENDORS: NOT SET, STORE NUMBER: NOT SET

| | | SALES | | | COST OF GOODS | | INVENTORY | | | TURN | PROFIT | | | AGED | | |
|---|---|---|---|---|---|---|---|---|---|---|---|---|---|---|---|---|
| CATEGORY | DETAIL/COL | SALES | UNITS | AVG TICKET | COST | AVG COST | COST ONHAND | UNITS | AVG COST OH | OVER | GP$ | GP% | GMROI | COST OF AGED | UNITS | %AGED STOCK |
| DIA EAR | | $1,235,271 | 374 | $3,303 | $588,958 | $1,495 | $917,650 | 519 | $1,768 | 0.61 | $676,313 | 0.55 | 0.74 | $596,848 | 302 | 65% |
| DIA PD | | $1,126,586 | 449 | $2,509 | $505,922 | $1,127 | $713,967 | 613 | $1,165 | 0.71 | $620,664 | 0.55 | 0.87 | $511,925 | 432 | 72% |
| LOOSE DIA .30 CT. RND | | $1,013,780 | 152 | $6,607 | $522,216 | $3,436 | $188,306 | 49 | $3,843 | 2.77 | $491,564 | 0.48 | 2.61 | $5,080 | 3 | 3% |
| DIA-LOOSE | | $905,137 | 149 | $6,075 | $498,830 | $2,316 | $385,226 | 115 | $3,350 | 1.29 | $406,307 | 0.45 | 1.05 | $202,448 | 50 | 53% |
| LOOSE-DIA | | $646,488 | 142 | $4,553 | $328,803 | $1,322 | $313,482 | 87 | $3,603 | 1.05 | $317,685 | 0.49 | 1.01 | $196,870 | 46 | 63% |

FIG. 9

VENDOR: [SELECT ALL ▽] [ALL ▽] STORE #: [SELECT 1 2 ▽] PRICE PT: [ALL ▽] [DETAILS|PRICEPOINT ▽]

START DATE [        ] END DATE [        ] [FILTER] [CLEAR]

PAGE [1 ▽] OF [4 ▽] [PDF ▽]

STYLES ANALYSIS REPORT FOR:
DATA SETS:
CATEGORIES: NOT SET, VENDORS: NOT SET, STORE NUMBER: NOT SET

| | | SALES | | | COST OF GOODS | | | INVENTORY | | | TURN | PROFIT | | | AGED | | |
|---|---|---|---|---|---|---|---|---|---|---|---|---|---|---|---|---|---|
| CATEGORY | DETAIL/COL | SALES | UNITS | AVG TICKET | COST | AVG COST | COST ONHAND | UNITS | AVG COST OH | OVER | GP$ | GP% | GMROI | COST OF AGED | UNITS | %AGED STOCK |
| DIA PD | $600-$800 | $0 | 0 | $0 | $0 | $0 | $580 | 2 | $290 | 0.00 | $0 | 0.00 | 0.00 | $580 | 2 | 100% |
| DIA PD | $800-$1000 | $3,675 | 4 | $919 | $1,430 | $358 | $840 | 2 | $420 | 1.70 | $2,245 | 0.61 | 2.67 | $840 | 2 | 100% |
| DIA PD | $1000-$1500 | $6,386 | 5 | $1,277 | $2,600 | $520 | $2,330 | 5 | $466 | 1.12 | $3,786 | 0.59 | 1.62 | $1,240 | 3 | 53% |
| DIA PD | $1500-$2000 | $10,411 | 6 | $1,735 | $4,760 | $793 | $7,615 | 11 | $692 | 0.63 | $5,651 | 0.54 | 0.74 | $5,380 | 8 | 71% |
| DIA PD | $2000-$2500 | $2,380 | 1 | $2,380 | $990 | $990 | $4,390 | 5 | $878 | 0.23 | $1,390 | 0.58 | 0.32 | $4,390 | 5 | 100% |

FIG. 10

CATEGORY: [SELECT ▽] [ALL ▽] [.40-.65 ROUND ▽] STORE #: [ALL ▽] [SELECT ▽] [1] [2 ▽] PRICE PT: [ALL ▽]

START DATE [          ]  END DATE [          ]                    [DETAILS|SUMMARY ▽]

PAGE [1 ▽] OF [2 ▽]                                          [FILTER] [CLEAR]

STYLES ANALYSIS REPORT FOR:
DATA SETS:
CATEGORIES: NOT SET, VENDORS: NOT SET, STORE NUMBER: NOT SET                            [PDF ▽]

| VENDOR | DETAIL/COL | SALES | | | COST OF GOODS | | INVENTORY | | | TURN | PROFIT | | | AGED | | |
|---|---|---|---|---|---|---|---|---|---|---|---|---|---|---|---|---|
| | | SALES | UNITS | AVG TICKET | COST | AVG COST | COST ON-HAND | UNITS | AVG COST OH | OVER | GP$ | GP% | GMRO | COST OF AGED | UNITS | %AGED STOCK |
| | | $2,911,358 | 932 | $3,124 | $1,388,928 | $1,490 | $884,552 | 500 | $1,769 | 1.57 | $1,522,429 | 0.52 | 1.72 | $371,463 | 162 | 42% |
| | | $1,871,663 | 531 | $3,525 | $900,212 | $1,695 | $422,599 | 249 | $1,697 | 2.13 | $971,451 | 0.52 | 2.30 | $103,094 | 83 | 24% |
| | | $1,778,277 | 495 | $3,594 | $914,780 | $1,848 | $1,003,331 | 441 | $2,275 | 0.91 | $864,497 | 0.49 | 0.86 | $675,051 | 260 | 67% |
| | | $1,275,392 | 379 | $3,365 | $638,963 | $1,554 | $703,479 | 389 | $1,808 | 0.84 | $636,429 | 0.54 | 0.98 | $346,288 | 205 | 49% |
| | | $805,105 | 151 | $5,332 | $406,476 | $2,692 | $394,003 | 234 | $1,684 | 1.03 | $398,633 | 0.50 | 1.01 | $108,438 | 46 | 28% |

FIG. 11

CATEGORY: [ALL ▽] [.40-.65 ROUND ▽] [SELECT ▽] [DETAILS|CATEGORY ▽]
[.90-1.5 FANCY ▽] STORE #: [1] [2 ▽] PRICE PT.: [ALL ▽]

START DATE [          ]    END DATE [          ]    [FILTER] [CLEAR]

PAGE [5 ▽] OF [16 ▽]    [PDF ▽]

STYLES ANALYSIS REPORT FOR:
DATA SETS:
CATEGORIES: NOT SET, VENDORS: NOT SET, STORE NUMBER: NOT SET

| VENDOR | SALES | | | COST OF GOODS | | INVENTORY | | | TURN | PROFIT | | | AGED | | |
|---|---|---|---|---|---|---|---|---|---|---|---|---|---|---|---|
| DETAIL/COL | SALES | UNITS | AVG TICKET | COST | AVG COST | COST ONHAND | UNITS | AVG COST OH | OVER | GP$ | GP% | GMROI | COST OF AGED | UNITS | %AGED STOCK |
| HOF LOOSE HOF | $196,337 | 58 | $3,385 | $101,930 | $1,757 | $79,061 | 18 | $4,392 | 1.29 | $94,407 | 0.48 | 1.19 | $42,267 | 11 | 53% |
| HOF PD | $58,766 | 31 | $1,896 | $28,499 | $919 | $30,676 | 35 | $876 | 0.93 | $30,267 | 0.52 | 0.99 | $18,196 | 19 | 59% |
| HOF RING | $47,092 | 11 | $4,281 | $24,729 | $2,248 | $15,350 | 7 | $2,193 | 1.61 | $22,363 | 0.47 | 1.46 | $8,850 | 4 | 58% |
| HOF WED RING | $88,913 | 46 | $1,933 | $40,657 | $884 | $28,875 | 29 | $996 | 1.41 | $48,256 | 0.54 | 1.67 | $14,505 | 16 | 50% |
| RING BRIDGEN $2.00 | $700 | 1 | $700 | $280 | $280 | $0 | 0 | $0 | 0.00 | $420 | 0.60 | 0.00 | $0 | 0 | 0% |

FIG. 12

VENDOR: [SELECT / ALL ▽]

CATEGORY: [SELECT / ALL / .40-.65 ROUND / .90-1.5 FANCY ▽]

STORE #: [ALL / SELECT 1 2 ▽]  PRICE PT: [ALL ▽]

START DATE [____]  END DATE [____]  [FILTER] [CLEAR]

[DETAILS/SUMMARY ▽]

PAGE [1 ▽] OF [1 ▽]   [PDF ▽]

STYLES ANALYSIS REPORT FOR:
DATA SETS:
CATEGORIES: NOT SET, VENDORS: NOT SET, STORE NUMBER: NOT SET

| PRICE POINT | SALES | | | COST OF GOODS | | INVENTORY | | | TURN | PROFIT | | | AGED | | |
|---|---|---|---|---|---|---|---|---|---|---|---|---|---|---|---|
| DETAIL/COL | SALES | UNITS | AVG TICKET | COST | AVG COST | COST ON-HAND | UNITS | AVG COST OH | OVER | GP$ | GP% | GMROI | COST OF AGED | UNITS | %AGED STOCK |
| $500-$7500 | $2,805,417 | 470 | $5,969 | $1,285,832 | $2,735 | $1,719,173 | 668 | $2,574 | 0.75 | $1,519,885 | 0.54 | 0.88 | $966,660 | 396 | 57% |
| $15,000-$15,000+ | $1,728,247 | 70 | $24,689 | $1,035,075 | $14,787 | $1,553,356 | 125 | $12,427 | 0.67 | $692,472 | 0.40 | 0.45 | $1,053,322 | 84 | 68% |
| $10,000-$15,000 | $1,708,414 | 142 | $12,031 | $867,444 | $6,109 | $1,474,914 | 260 | $5,673 | 0.59 | $840,970 | 0.49 | 0.57 | $943,703 | 170 | 64% |
| $3000-$4000 | $1,643,253 | 483 | $3,402 | $757,884 | $1,569 | $965,625 | 684 | $1,412 | 0.78 | $885,368 | 0.54 | 0.92 | $539,917 | 406 | 56% |
| $4000-$5000 | $1,524,866 | 359 | $4,198 | $673,134 | $1,986 | $828,085 | 447 | $1,853 | 0.81 | $851,733 | 0.56 | 1.03 | $515,696 | 289 | 62% |

DATA SETS:
CATEGORIES: NOT SET, VENDORS: NOT SET, STORE NUMBER: NOT SET

VENDOR: [▲/▼ box]

CATEGORY: [SELECT / ALL / .40-.65 ROUND / .90-1.5 FANCY ▲/▼]

FROM LAST: [12 MONTHS ▼]

[FILTER] [CLEAR]

| CATEGORY | VENDOR | STOCK NO. | VENDOR STYLE | STORE # | ON-HAND | UNIT COST | UNIT RETAIL | ADJ. PRICE | DAYS OLD | |
|---|---|---|---|---|---|---|---|---|---|---|
| 420-GOLD REM/S/SOL | | 011-420-00884 | MTR75988W | | 1 | 460.00 | 500.00 | | 495 | PRICE |
| 420-GOLD REM/S/SOL | | 011-420-00921 | MTR99808W | | 1 | 400.00 | 900.00 | | 379 | PRICE |
| 190-DIA-LOOSE | | 011-190-00563 | DRM-DRM11681 | | 1 | 7572.23 | 14130.00 | | 553 | PRICE |
| 190-DIA-LOOSE | | 011-190-00565 | HOF-HOF83354 | | 1 | 1855.00 | 4075.00 | | 553 | PRICE |
| 190-DIA-LOOSE | | 011-190-00556 | HOF-HOF82063 | | 1 | 6500.00 | 12400.00 | | 553 | PRICE |

FIG. 16

VENDOR: ▷ CATEGORY: ▷ 120-DIA ANNI RING ▷ FILTER CLEAR SUMMARY

SORT1: ▷ SORT2: ▷ SORT3: ▷ SORT START: END DATE

| CATEGORY | VENDOR | STOCK NO. | VENDOR STYLE | #SOLD | ON-HAND | S# | UNIT COST | UNIT RETAIL | QTY | DAYS IN STOCK |
|---|---|---|---|---|---|---|---|---|---|---|
| | | | HBR5D50508W | 3 | 3 | | 1,080.00 | 2,082.50 | 1 | 3 |
| | | | 5STB0100PL | 3 | 2 | | 2,900.00 | 6,000.00 | 1 | 49 |
| | | | 5STB00338W | 85 | 55 | | 726.00 | 1,560.00 | 5 | 47 |
| | | | 5STB00268W | 34 | 23 | | 590.00 | 1,400.00 | 1 | 17 |
| | | | | | | | | | | |
| | | | | | | | | | | |

FIG. 17

VENDOR: [ ] CATEGORY: [ ALL ▽ ] [ FILTER ] [ CLEAR ] [ SUMMARY ▽ ]

SORT1: [ ON HAND ▽ ] SORT2: [ ▽ ] SORT3: [ ▽ ] [ SORT ] START: [ ] END DATE [ ]

| CATEGORY | VENDOR | STOCK NO. | VENDOR STYLE | #SOLD | ON-HAND | S# | UNIT COST | UNIT RETAIL | QTY | DAYS IN STOCK |
|---|---|---|---|---|---|---|---|---|---|---|
| | | | 10STC2000ST | 1 | 0 | | 4,000.00 | 8,700.00 | 1 | 2 |
| | | | 3SIE00258W-1/2PR | 1 | 0 | | 207.50 | 350.00 | 1 | 3 |
| | | | 4DIE01008W | 1 | 0 | | 3,000.00 | 5,100.00 | 1 | 2 |
| | | | 4SCD0558W | 2 | 0 | | 1,200.00 | 2,700.00 | 1 | 1 |
| | | | 5SCD0090PL | 1 | 0 | | 2,400.00 | 4,700.00 | 1 | 5 |

FIG. 18

VENDOR-BASED INVENTORY MANAGEMENT SYSTEM AND METHOD

CROSS-REFERENCE TO RELATED APPLICATIONS

This invention claims priority, under 35 U.S.C. §120, to the U.S. Provisional Patent Application No. 61/176,580 to Sherman et al. filed on May 8, 2009, which is incorporated by reference herein.

BACKGROUND OF THE INVENTION

Field of the Invention

The present invention relates to merchandising systems, apparatus, computer readable media, and methods, specifically to a vendor-based inventory management system, apparatus, computer readable media and method.

Description of the Related Art

One of the challenges facing retailers today is proper inventory management. Poor inventory management often adversely impacts cash flow and profits. Some improvements have been made in the field. Examples of references related to the present invention are described below in their own words, and the supported teachings of each reference are incorporated by reference herein:

U.S. Publication No.: 2004/0049465 by Engler et al. discloses a method of generating custom reports based on point-of-sale data transferred between multiple remote computing devices and a central computing device includes generating point-of-sale data at multiple remote locations, transferring the point-of-sale data to a central computing device from multiple computing devices at the respective multiple remote locations, defining a custom report format, the custom report format specifying at least two of the multiple remote locations and specifying a date range, the date range and the at least two multiple remote locations being freely selectable by a user, generating a custom report using the custom report format, the custom report being based on point-of-sale data related to the specified remote locations and the specified date range, and communicating the custom report to a human being. A computer program embodied on a computer-readable medium for generating custom reports is also disclosed, as are subscription services, computer systems, graphical user interfaces and other features.

U.S. Publication No. 2004/0181454 by Manno discloses a network or web-based point of sale (WPOS) system employs a store server and point-of-sale client computers that are connected over a store LAN or over the Internet to the server. The server provides all necessary operating drivers for cash drawer, scanners, and other point-of-sale peripherals via the web browser of the client computers. An instant kiosk retail solution can involve a remote computer terminal installed via the Internet, and will support peripheral POS devices. The web-based system permits management to obtain store performance reports remotely, and permits customers to schedule and reschedule appointments and delivery times. Servers at two or more store sites can communicate with one another and with a headquarters mainframe. The WPOS can be implemented as an integrated suite for collaboration between store locations.

U.S. Publication No. 2003/0115285 by Lee et al. discloses a Web-based inventory management information system is proposed, which allows a company's inventory management taskforce to browse via Internet for all inventory-related information, including the incoming plans of inter-company purchase order, direct shipment, and local supply, as well as the company's current and future inventory stock, sales orders, market forecast, and so on, for the purpose of allowing everyone on the company's inventory management taskforce to learn and be well-informed of such information quickly and conveniently via Internet. The proposed Web-based inventory management information system is characterized by the use of a Web server to serve up all the inventory-related information in an online manner through Internet, so that everyone on the company's inventory management taskforce can conveniently gain access to all the inventory-related information via Internet.

U.S. Pat. No. 6,633,851, issued to Engler et al. discloses a method of generating custom reports based on point-of-sale data transferred between multiple remote computing devices and a central computing device includes generating point-of-sale data at multiple remote locations, transferring the point-of-sale data to a central computing device from multiple computing devices at the respective multiple remote locations, defining a custom report format, the custom report format specifying at least two of the multiple remote locations and specifying a date range, the date range and the at least two multiple remote locations being freely selectable by a user, generating a custom report using the custom report format, the custom report being based on point-of-sale data related to the specified remote locations and the specified date range, and communicating the custom report to a human being. A computer program embodied on a computer-readable medium for generating custom reports is also disclosed, as are subscription services, computer systems, graphical user interfaces and other features.

U.S. Pat. No. 6,611,839, issued to Nwabueze discloses a computer implemented method for acquiring and presenting data for business analysis, and a computer readable media having program instructions for enabling the same are provided. One exemplary method identifies a set of data sources to be accessed for a user, acquires raw data from the data sources, stores the raw data from the data sources to raw data type specific locations and verifies the integrity of the stored raw data. Next the acquired raw data is transferred to processed data type specific compartments. The transferring process further includes detecting the data type of each of the raw data type specific compartments and converting the raw data to a uniform data type. The processed data is then transferred to a temporary database where display rules are applied. A requested report is then presented to the customer.

The inventions heretofore known, above described and/or otherwise, suffer from a number of disadvantages which include being limited in use, being limited in applicability, being difficult to use, being ineffective, being expensive, failing to recognize opportunities, and being inefficient.

What is needed is a vendor-based inventory management system and method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available inventory management system and methods. Accordingly, the present invention has been developed to provide an efficient and effective vendor-based inventory management system, apparatus, computer readable storage medium, and method.

According to one embodiment of the invention, there is a vendor-based inventory management system, apparatus, and/or computer readable storage medium configured to facilitate management of retailer inventory associated with a vendor using a computing device. Such may include a communication module in communication with a plurality of remote point-of-sale (POS) systems over a network such that the communication module is receptive to POS data from a plurality of store locations. The communication module may be in direct communication with contact management module. Such may also include a data storage module in communication with the communication module and including a memory storage device that stores POS data received through the communication module. The communication module may include a communication device.

There may be an interface module in communication with the data storage module and/or that reports comparative historical POS data across a plurality of store locations. The interface module may include an interface device. The interface module may display data associated with suggested beneficial transactions. The interface module may also display suggested beneficial transactions including received store location data. Furthermore, it may be that the interface module suggests related transactions involving a plurality of store locations, wherein the sum of the related transactions is financially beneficial to the vendor.

In addition, the system may include a data analysis module in communication with the data storage module, including a computing device that analyzes data stored therein and suggest beneficial transactions; and a contact management module in communication with the data storage module and that manages contact information across a plurality of store locations and associate the same with reported suggested beneficial transactions. The data analysis module may be that queries the data storage module for POS data by stock keeping unit across a plurality of store locations, to score the received store location data by inventory age, inventory amount, and/or volume, and to sort received store location data by score. The data analysis module may also be that sorts received store location data into reprovision groups and to calculate expected gains from reprovision permutations between the groups. There may be a processor and/or a computing device. The processor may be in communication with a data storage device, interface device, and/or a communication device.

According to one embodiment of the invention, there is a method of inventory management using a computing device and configured to facilitate beneficial management of inventory and/or a computer readable storage medium storing a computer program having instructions for performing one or more of the steps of the method. The computer readable storage medium storing a computer program may be/include tangible, hardware, distributed, and/or a physical media device. The method may include the step receiving point-of-sale (POS) data from a store location. The method may include the step of storing the POS data in a memory storage device. The method may also include reporting the POS data by stock keeping unit (SKU) thereby generating a SKU sales report including historical volume data and current inventory level data. As used herein, except where explicitly and undeniably otherwise, SKU is intended in the broad sense of its words and not in the narrow sense of any particular numbering or indexing system. In addition, the method may include sorting the SKU sales report by volume data and searching the SKU sales report for a slow moving SKU having high inventory levels. The method may include reprovisioning a store location having a slow moving SKU having high inventory levels.

Furthermore, the method may include the step of receiving POS data from a second store location and comparing sales by SKU across both locations. The method may also include the step of reprovisioning the first and second store locations such that a single SKU is associated with the reprovisioning of each. The method may further include the step of querying the memory storage device for POS data by stock keeping unit across a plurality of store locations and scoring the received store location data by inventory age, inventory amount, and/or volume; and sorting received store location data by score. Moreover, the method may include the step of sorting received store location data into reprovision groups and calculating expected gains from reprovision permutations between the groups.

There may be a vendor-based inventory management system that may be configured to facilitate management of retailer inventory associated with a vendor using a cloud-based computing service. The system may include one or more of the following: a communication module that may be in communication with a plurality of remote point-of-sale (POS) systems over a network such that the communication module is receptive to POS data from a plurality of remote store locations and including a network communication device; a data storage module that may be in communication with the communication module and including a memory storage device of a server that stores POS data received through the communication module and responds to queries against the POS data; an interface module that may be in communication with the data storage module and that may dynamically report comparative historical POS data across a plurality of store locations that may be in a manner accessible to a remote interface device such that the user of a remote interface device is enabled alter a report view and/or wherein the interface module is receptive to query instructions from a remote interface device; and/or a data analysis module that may be in communication with a data storage module, including a processor that analyzes data stored therein and suggests beneficial transactions that are reported through the interface device.

An interface module may dynamically report historical POS data for a single store location to a remote interface device. There may be a contact management module that may be in communication with the data storage module and/or that may manage contact information across a plurality of store locations and/or associate the same with selected suggested beneficial transactions. A data analysis module may query a data storage module for POS data by stock keeping unit across a plurality of store locations, may score the received store location data by inventory age, inventory amount, and/or volume, and/or may sort received store location data by score. A data analysis module may sort received store location data into reprovision groups and/or calculate expected gains from reprovision permutations between the groups. An interface module may restrict access to POS data by user account.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 6-18 illustrate a plurality of prophetic screenshots of a vendor-based inventory management system, according to one embodiment of the invention.

DETAILED DESCRIPTION OF THE INVENTION

Figure 1:
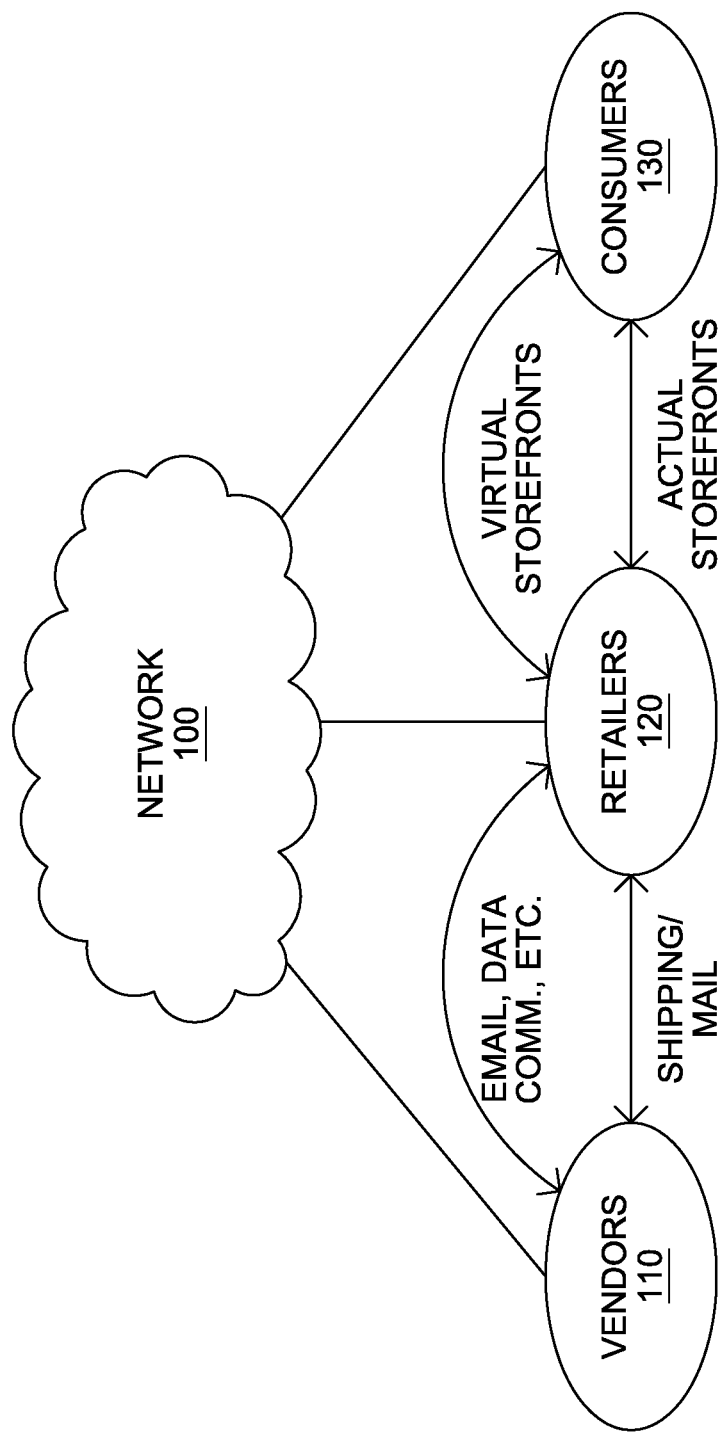
FIG. 1 is a network diagram of a vendor-retailer-consumer system, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to a person skilled in the relevant art and having possession of this disclosure, are to be considered within the scope of the invention.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations, including over different storage devices, and may exist, at least partially, merely as electronic signals on a system or network.

The various system components and/or modules discussed herein may include one or more of the following: a host server or other computing systems, including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: Point of Sale logs, inventory data, customer logs, retailer data, supplier data, and/or systems and/or protocols known under the names Oracle, Sybase, DB2, MS SQL Server, Informix databases, etc.; and/or like data useful in the operation of the present invention. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as JSON, C, C++, Java, COBOL, assembler, PERL, Visual Basic, SQL Stored Procedures, AJAX, extensible markup language (XML), with the various algorithms being implemented with any combination of data structures, objects, processes, routines, or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, that may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields, and/or pulses, and/or so forth.

It is envisioned that any of the modules described herein may also be embodied as a signal on a carrier wave instead of or in addition to existing as a module. A signal on a carrier wave includes but is not limited to: wireless networking signals, radio signals, cellular phone network signals, magnetic flux signals, and wired networking signals. Such are generally transmitted under a signal protocol, such as but not limited to TCP/IP, IPX, Appletalk, and the like. As a non-limiting example, a module consisting of an instruction set on a tangible computer readable medium may be transmitted as a signal on a carrier wave to a computing device that is receptive to signals on a carrier wave As used herein, the term "network" may include any electronic communication means which incorporates both hardware and software components of such. Communication among the parties in accordance with the present invention may be accomplished through any suitable communication channels, such as, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked, or linked devices, and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a network diagram of a vendor-retailer-consumer system, according to one embodiment of the invention. The illustrated embodiment includes a computerized network 100 in communication with a plurality of representative vendors 110, a plurality of representative retailers 120 and a plurality of representative consumers 130. The figure illustrates non-limiting examples of the varied relationships among the parties.

In particular, the illustrated plurality of vendors 110 are in communication with the illustrated plurality of retailers 120 over the illustrated network 100 through email, POS data, inventory data, etc. Business communications, payments, orders, return instructions, fulfillment instructions, and the like are often handled over the network 100. In addition, the retailers 120 generally order inventory from the vendors 110 to sell in the retailer's storefronts and/or virtual storefronts. The vendors 110 ship inventory to the retailers 120 to sell from virtual storefronts, such as but not limited to merchant websites, and/or from physical storefronts to consumers. The consumers may visit the virtual storefronts through a network and/or visit an actual storefront to purchase inventory. Generally, the retailer provides product to the consumer. However, in some cases, a retailer may instruct a vendor to ship product directly to a consumer (not illustrated).

Figure 2:
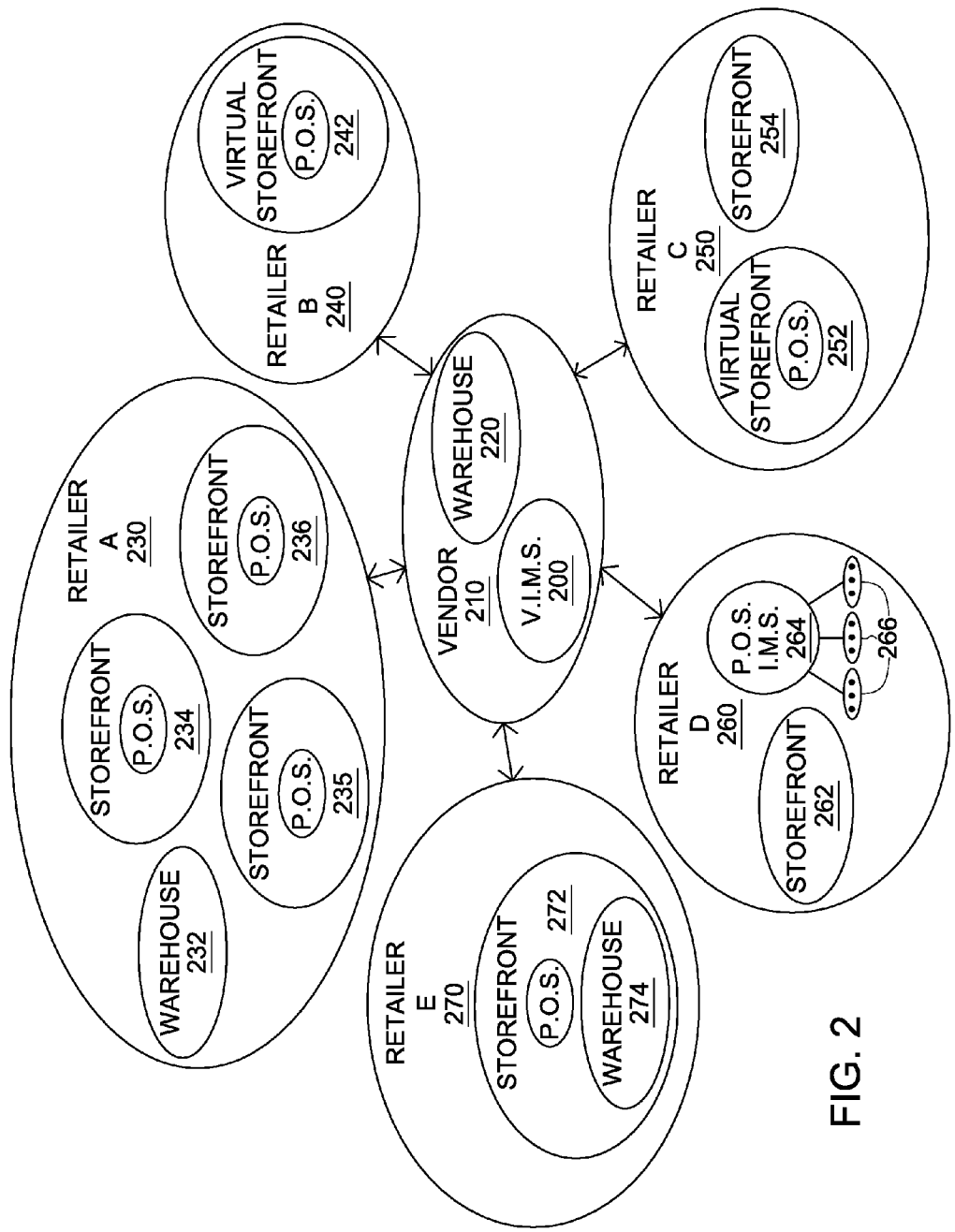
FIG. 2 is a relational diagram of a plurality of vendor-retailer systems including a vendor-based inventory management system, according to one embodiment of the invention.

FIG. 2 is a relational diagram of a plurality of vendor-retailer systems including a vendor-based inventory management system 200, according to one embodiment of the invention. The illustrated vendor 210 is associated with a plurality of retailers, namely, Retailer A 230, Retailer B 240, Retailer C 250, Retailer D 260 and Retailer E 270. Each of the illustrated retailers is configured differently in either how it interacts with customers, how it stores inventory, and how it tracks inventory. Accordingly, interactions among the vendor 210 and each retailer and its associated customers may be different.

The illustrated vendor 210 includes a vendor-based inventory management system 200 and a warehouse 220. The illustrated vendor-based inventory management system (VIMS) 200 is configured to facilitate management of retailer inventory associated with a vendor 210, such as but not limited to products sold to a retailer by a vendor, products protected by intellectual property owned by a vendor, products branded by a vendor, and the like. The VIMS 200 may be owned and operated by the vendor or may be owned, operated, controlled, licensed by/to/from a third party, such as but not limited to wherein the VIMS is provided as a cloud-based service to the vendor and/or associated retailers. The service may be vendor-based and simultaneously provided retailer-based services as well. The illustrated warehouse stores inventory under the control of the vendor 210.

The illustrated vendor 210 receives point of sale (POS) data from each storefront of each of the illustrated retailers. POS data includes information regarding sale of inventory and may include one or more of the following information types: item number (stock keeping unit (SKU), model number, etc.), sale date, sale amount, customer (id, name, number, etc.), number sold, other items sold together with the product, total sale amount (number, volume, purchase amount, etc.), serial number, store location, salesperson, cashier, and the like. Examples of centralized SKU-type systems are UPC, EAN, GTIN, and APN.

The illustrated vendor-based inventory management system 200 analyzes and filters the POS data and suggests inventory reprovisioning for each storefront 280 from the vendor warehouse 220. Current inventory levels may be calculated from previous POS data, provisioning data, connection to an inventory management system, etc., and/or combinations thereof. The vendor 210 may also suggest reprovisioning of inventory between the storefronts 280 and warehouse 290 of Retailer A.

POS systems are utilized in retail settings to track sales and may be coupled to, in communication with, associated with, operated together with, and/or integrated with other systems, including but not limited to inventory management systems, accounting systems, security systems, and the like. Some examples of POS systems include but are not limited to HP POS system Rp5700, by Hewlett Packard Company, 3000 Hanover Street, Palo Alto, Calif., 94304; pcAmerica Retail POS system, by pcAmerica, One Blue Hill Plaza 2$^{nd}$ Floor, PO Box 1546, Pearl River, N.Y., 10965; POSMicro Premier Retail POS PMSM-2-BO, by POSMicro, 1225 E. Sunset Dr. Ste 145 #356, Bellingham, Wash., 98226.

Retailer A 230 includes a plurality of storefronts 234, 235, and 236 configured to distribute and sell inventory each utilizing a POS system and a warehouse 232 that stores inventory for Retailer A 230 and Retailer A's plurality of storefronts. Accordingly, Retailer A will generally order inventory for each of its storefronts and store surplus inventory in the warehouse. Accordingly, POS and/or inventory data from Retailer A may include information about inventory stored, received by, and/or transferred from the warehouse.

Retailer B 240 also sends POS data to the vendor 210. Retailer B includes a virtual storefront 242 configured to distribute and sell inventory over a computerized network, such as a website. Retailer B does not include a warehouse. Accordingly, it may be that Vendor 210 drop-ships to customers for the benefit of Retailer B from the warehouse 220 of Vendor 210. This may be the case, in part or in entirety for other illustrated retailers. The virtual storefront 242 includes a POS system, such as but not limited to an internet shopping cart. Nonlimiting examples of internet shopping carts include Big Commerce, by Interspire Inc., 9606 N. MoPac Suite 960, Austin, Tex., 78759; Shopsite Pro by Shopsite Inc., 51 West Center, #511, Orem, Utah, 84057; X-Cart:PHP Shopping Cart software by Creative Development, Krasnoarmeyskaya 111, 432071, Ulyanovsk, Russia.

Retailer C 250 includes a virtual storefront 252 and a physical storefront 254 configured to sell and distribute inventory to consumers. Employees at the physical storefront utilize the POS system of the virtual storefront to track sales. There will either be a selection or secondary system (such as but not limited to reconciliation with shipping records) that allows differentiation between sales made at the physical storefront and those of the virtual storefront or the two may be conceptualized as unitary. POS data from the virtual storefront and the physical storefront is sent to the vendor-based inventory management system 200 upon purchase of inventory from Retailer C 250. The vendor-based inventory management system 200 analyzes and filters the data and suggests an inventory reprovision for Retailer C 250. The system 200 may also suggest reprovisioning between the virtual storefront and the actual storefront of Retailer C 250 where appropriate, especially if not all product is offered for sale at each storefront.

Retailer D 260 includes a storefront 262 and a point of sale inventory management system 264. The POS inventory management system 264 manages a plurality of storefronts 266 that may be virtual, physical, and/or combinations thereof. A POS inventory management system includes both POS tracking functionality and inventory management functionality that may be similar to that of the VIMS 200 of the vendor 210. It may be a single system or may be multiple systems functioning in at least a minimally coordinated manner. Accordingly, Retailer D 260 may be enabled to track inventory across storefronts and make comparisons similar to that of the vendor 210, but is not enabled to track inventory and/or POS data across separate retailers. The plurality of virtual storefronts 266 may included alternatively branded storefronts and/or affiliate sites.

Retailer E 270 includes a storefront 272 having a warehouse 274 within the storefront 272. Retailer E sends POS data to the vendor upon inventory purchases from consumers visiting the storefront 280. The vendor-based inventory management system 200 analyzes and filters the data sent from Retailer E and suggests reprovisioning of the storefront 270.

Moreover, the vendor 210 may also suggest reprovisioning between the plurality of retailers 230, 240, 250, 260, and 270; and also within, and/or between virtual storefronts and/or actual storefronts of each retailer. It is understood that the illustrated retailers are non-limiting exemplary embodiments of retailer-vendor relationships and/or capabilities and that any variations, combinations, permutations of the illustrated embodiments are contemplated herein. Non-limiting examples of retailer types include: franchises, dealerships, warehouse stores, single owner stores, local chains, national chains, trade-show vendors, and the like.

Figure 3:
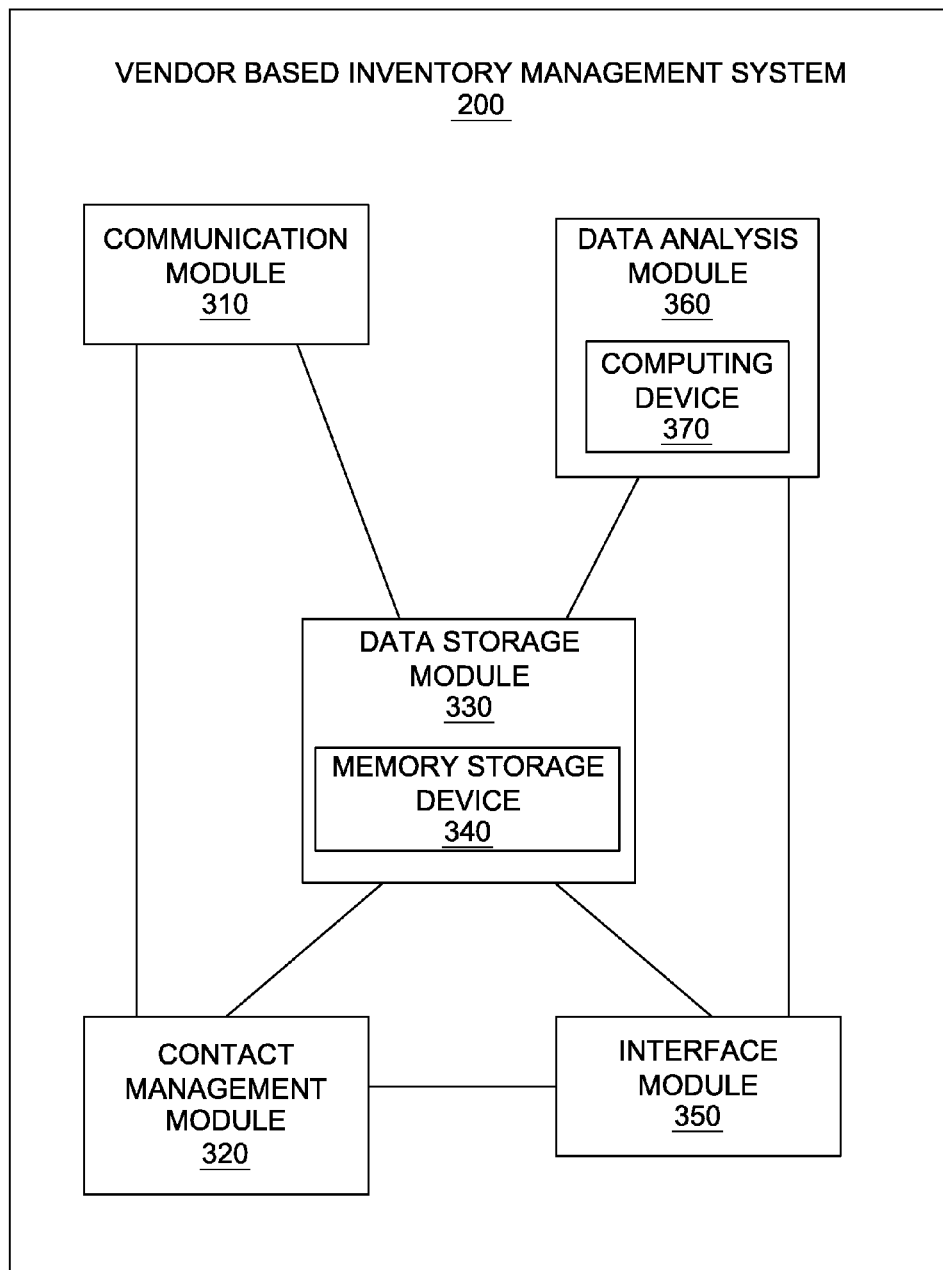
FIG. 3 is a module diagram of a vendor inventory management system, according to one embodiment of the invention.

FIG. 3 is a module diagram of a vendor inventory management system 200, according to one embodiment of the invention. There is a vendor-based inventory management system 200 configured to facilitate management of retailer inventory associated with a vendor using a computing device. The system 200 includes a communication module 310, a data analysis module 360, a data storage module 330, a contact management module 320, and an interface module 350. The associated modules operate to facilitate inventory management across a plurality of retailers.

The illustrated communications module 310 is in communication with a plurality of remote point-of-sale (POS)

systems over a network such that the communication module is receptive to POS data from a plurality of store locations and is in communication with the data storage module 330 and the contact management module. In particular, the communication module is configured such that POS data may be received when pushed or pulled from remote data systems. Non-limiting examples of network modules include: transponders, network cards, wireless hubs, Ethernet devices, and the like. A non-limiting example of a network card may be a Belkin Gigabit Ethernet Express Card, by Belkin International Inc., 12045 E. Waterfront Dr., Playa Vista, Ca, 90094.

The illustrated data storage module 330 is in communication with each of the communication module 310, the data analysis module 360, the interface module 350, and the contact management module 320. The illustrated data storage module 330 includes a memory storage device 340 that stores POS data received through the communication module 310. Non-limiting examples of a memory storage device include: hard drives, flash drives, RAM, floppy drives, magnetic tape, optical disc, DVD, and the like. Data storage modules may include databases, data storage systems, and/or data files, such as but not limited to MySQL, Oracle, Windows Explorer, and the like. Another non-limiting example of a database is Filemaker Pro 11, by Filemaker Inc., 5261 Patrick Henry Dr., Santa Clara, Calif., 95054. The data storage module stores information used by and/or produced by/for other modules.

The illustrated interface module 350 is in communication with the contact management module 320, the data storage module 330, and the data analysis module 360 and provides an interface for a user, such that the user may interact with and/or receive information from the VIMS 200. An interface module 350 may report comparative historical POS data and this information may be displayed across a plurality of store locations. An interface module 350 may be configured to display data associated with suggested beneficial transactions. An interface module 350 may also be configured to display suggested beneficial transactions including received store location data. Furthermore, an interface module 350 may suggest related transactions involving a plurality of store locations, wherein the sum of the related transactions is financially beneficial to the vendor. An interface module may include HTML code provided for a browser (Google Chrome, Windows Internet Explorer, Firefox, etc.), a client-server application, a Java script application and the like. An interface module may display tables of data that may be dynamically configurable. A non-limiting example of an interface module is described in US Patent Application No. 2010/0106609 by Sherman, et. al., which is incorporated herein in its entirety for its supporting teachings.

The illustrated data analysis module 360 is in communication with the data storage module 330 and the interface module 350 and analyzes POS data, inventory data, and/or the like. The data analysis module analyzes data according to a method, thereby providing beneficial information about the data, such as, but not limited to being able to suggest beneficial transactions. Non-limiting examples of a data analysis module includes electronic spreadsheets, customized programs (MatLab, Fortran, C++), scripts, and the like. The illustrated data analysis module 360 includes a computing device 370. Non-limiting examples of computing devices include computers, processors, smart phones, servers, state devices, and the like. A data analysis module may include a program or script (hardwired and/or software) that operates through a processor. The data analysis module 360 may query the data storage module 330 for POS data by stock keeping unit across a plurality of store locations, may score the received store location data by inventory age, inventory amount, and/or volume, etc., and/or may sort received store location data by score. The data analysis module 360 may also sort received store location data into reprovision groups and/or may calculate expected gains from reprovision permutations between the groups. One non-limiting example of a data analysis module configured for a different purpose is a Spectral Data Processor v4.5, by XPS International, 754 Leona Lane, Mountain View, Calif., 94040.

The illustrated contact management module 320 is in communication with the communication module 310, the data storage module 330 and the interface module 350 and manages contact information across a plurality of store locations and/or associates the same with reported suggested beneficial transactions. The contact management module 320 may be a CRM system, database, spreadsheet, or the like that operates to track contact information in a manner that may be used by other module(s) to contact other entities. One non-limiting example of a contact management module is Microsoft Dynamic CRM, by Microsoft Corp., One Microsoft Way, Redmond, Wash., 98052.

While specific communication/associations are illustrated in FIG. 3, it is understood that other communications may exist in a VIMS 200 and/or that some of the communications illustrated may not be present in every embodiment of a VIMS 200. Further, while specific modules and devices are illustrated, such may not be present in every embodiment of a VIMS 200. More, while specific functionality, configuration, operation, and the like are discussed, not every embodiment of a VIMS 200 will include every discussed functionality, etc. and may include functionality, etc. not discussed herein.

In operation of the illustrated embodiment, the communication module 310 receives POS data and/or inventory data from a plurality of retail stores and forwards the information received (perhaps after processing, filtering, augmenting, or the like) to the data storage module. The data storage module stores the information according to a protocol or system in the memory storage device for later use by other modules. The data analysis module (automatically, by a schedule, and/or at the request of a user through the interface module) retrieves the data from the data storage module and processes the data to find opportunities to improve inventory management, including but not limited to provisioning and/or reprovisioning opportunities involving one or more store locations and/or entities. Through the interface module, a user is able to view these opportunities, associated data, and/or reports of data kept by the data storage module. The user may be enabled to facilitate, cause to occur, trigger, and/or etc. actions in favor of opportunities discovered by the system and/or those discovered by the user on viewing the data. As an example, the system may recommend reprovisioning between a pair of store locations. The user may select to move forward with the suggested transactions, which may trigger the contact management module to automatically email the store locations with the reprovision details and/or other involved parties (shipping, warehousing, and the like) such that the reprovisioning actions are appropriately taken. The exact details as to how/who is notified will be different, based on the specific vendor-retailer configurations (see FIG. 2 for examples).

Figure 4:
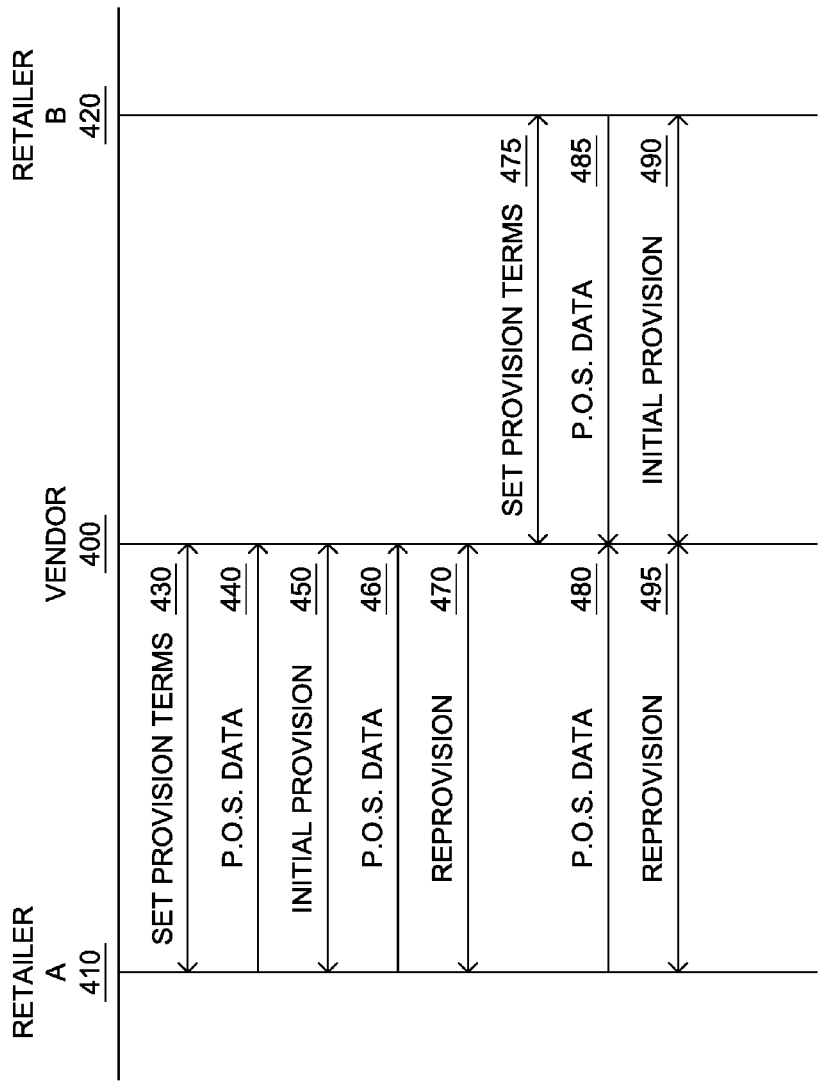
FIG. 4 is a sequence diagram of operation of a vendor-based inventory management system, according to one embodiment of the invention.

FIG. 4 is a sequence diagram of a vendor-based inventory management system, according to one embodiment of the invention. The illustrated sequence includes a vendor 400 having a vendor-based inventory management system in communication with a Retailer A 410 and a Retailer B 420. The illustrated sequence includes Retailer A setting provision terms to the vendor 430. Provision terms may include, but are not limited to, inventory data, budget limits, inventory storage data, pricing data, consumer data, etc. A non-limiting prophetic example of specific provision terms includes:

6 feet of vertical shelf space
  for necklaces, rings, and earrings of silver and gold with ruby and sapphire gemstones
  a budget limit of $80,000 (wholesale) and
  a minimum retail margin of 65%.

Another non-limiting example of provision terms includes a specific purchase order for a specific set of inventory.

In one embodiment, point of sale data is sent to a VIMS upon consumer purchases of inventory distributed from the vendor 440. Other inventory data may be sent as well, including but not limited to initial inventory levels and/or historical POS data. The illustrated sequence includes the vendor sending an initial provision 450 to Retailer A, which may include shipping on a first purchase order and/or shipping a first set of inventory items according to provisioning terms. Point of sale data is continued to be sent 460 to the VIMS upon purchases from Retailer A. Another reprovision 470 is sent from the vendor to Retailer A, in response to the POS data from the Retailer A. The reprovision may include a new purchase order, a return, a change in provisioning terms, etc., and/or any combination thereof.

The illustrated sequence also includes the vendor setting provision terms 475 for Retailer B. Point of sale data is sent 480 to the vendor from Retailer A and from Retailer B 485. The vendor reprovisions 495 Retailer A and also sends an initial reprovision 490 to Retailer B. Reprovisioning 495 and 490 may include associated reprovisioning, such that a synergistic benefit is achieved by associated reprovisioning between Retailer A 410, Vendor 400, and Retailer B 420. In one non-limiting example, slow moving product is returned from Retailer A 410 to Vendor 400 who ships the slow moving product to Retailer B 420 who is selling through that same product and therefore has a need for the same. Accordingly, Vendor 400 can replace the slow moving product for Retailer A with something more suitable, while Retailer B is able to increase profits. If Retailer B purchases the product for more than the return value for that same product for Retailer A, Vendor experiences increased cashflow from the transaction without any extra inventory burden.

Figure 5:
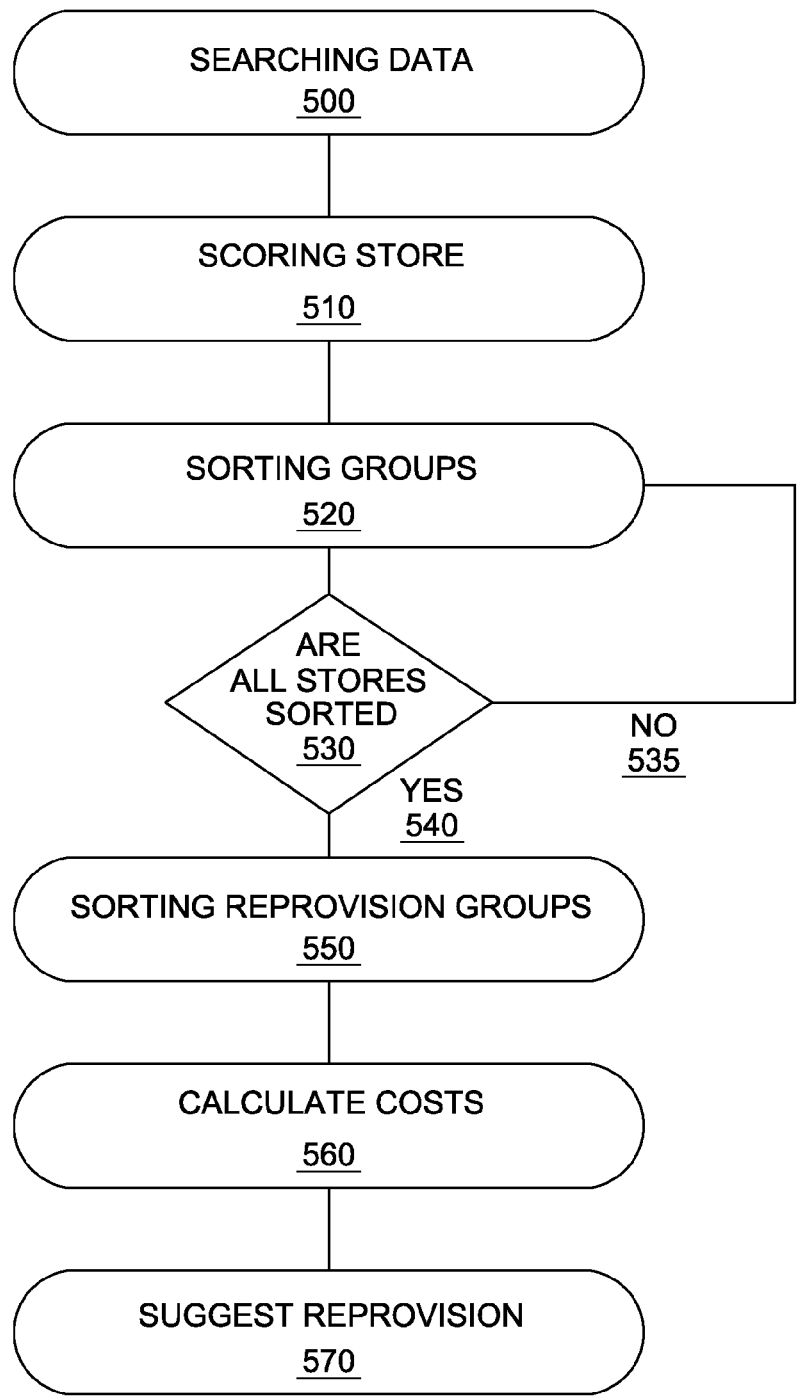
FIG. 5 is a flowchart of a vendor-based inventory management method, according to one embodiment of the invention.

FIG. 5 is a flowchart of a vendor-based inventory management method, according to one embodiment of the invention. According to one embodiment of the invention, there is a method of inventory management using a computing device and configured to facilitate beneficial management of inventory. The illustrated method includes the step of searching 500 point-of-sale (POS) and/or inventory data associated with a particular SKU (or model no., or other identifier) across a plurality of retailers and/or store locations. Then each retailer or store location is scored 510 according to indicator data, such as but not limited to inventory levels, historical volume, and the like. As a non-limiting example, locations may be scored by matching recent volume sold to a score matrix that provides a score for particular combinations of ranges of recent volume by current inventory, such that high inventory and low volume results in a negative score and high volume and low inventory results in a positive score. The scoring may be as simple as generating a single number for each location or may be more complicated, such as but not limited to generating a matrix of scores. Scoring may involve creating a record including store location and score.

Once scored, the locations are sorted 520 by score. Sorting may be as simple as separating those with negative scores from those positive scores. More complicated sorting may involve comparing matrix information among locations and/or sorting into multiple groups. Sorting may involve associating a sort code with a scoring record. Groups are sorted 520 until all locations have been sorted 530.

The illustrated method includes sorting 550 reprovision groups. This step includes associating location records having compatible scores and/or marking location records that appear to be good candidates for reprovisioning. As a non-limiting example, outlier scores (very high and/or very low scores) may be thus sorted and/or associated one with another for opportunities for reprovisioning and/or simultaneous associated reprovisioning.

Costs associated with reprovisioning and/or simultaneous reprovisioning sets are calculated and may be associated with reprovisioning records that may include locations, suggested reprovisioning terms. Benefits may also be calculated and may be summed with costs for net benefit analysis, sorting, reporting, and the like. Based on the results of the method, reprovisioning may be suggested 570, such as but not limited to displaying store locations, displaying suggested reprovisioning terms, displaying associations between locations, and the like.

The method may also include reporting/receiving POS data and/or inventory data by stock keeping unit (SKU) or other identifier thereby generating a SKU sales report including historical volume data and current inventory level data. In addition, the method may include sorting the SKU sales report by volume data and searching the SKU sales report for slow moving SKU having high inventory levels. The method may include reprovisioning a store location having a slow moving SKU having high inventory levels.

Furthermore, the method may include the step of receiving POS data from a second store location and comparing sales by SKU across both locations. The method may also include the step of reprovisioning the first and second store locations such that a single SKU is associated with the reprovisioning of each. The method may further include the step of querying the memory storage device for POS data by stock keeping unit across a plurality of store locations and scoring the received store location data by inventory age, inventory amount, and/or volume; and sorting received store location data by score. Moreover, the method may include the step of sorting received store location data into reprovision groups and calculating expected gains from reprovision permutations between the groups.

In one embodiment, a VIMS only receives, only process, or otherwise is only allowed access to inventory and/or POS data of a retailer associated with a particular vendor or vendor-list. Filtering may be accomplished at the POS system level, and the VIMS, or through an intermediary. Filtering may be by SKU, vendor id, ip address, access time, and/or other similar characteristic.

FIGS. 6-18 illustrate a plurality of prophetic screenshots of reports of a vendor-based inventory management system, according to one embodiment of the invention. In these reports, the term "vendor" means "retailer" as used herein.

In particular, FIG. 6 illustrates a report showing inventory/POS data comparisons for a pair of vendor styles (SKUs, model nos., etc.), namely 3FPS01758W ('58W) and 6PEN00128W ('28W). The illustrated vendor styles are scored by age and sorted and displayed thereby such that reprovisioning is suggested by the report. The illustrated report includes dynamic sort and filter capabilities, as evidenced by the sort categories (Sort1 through Sort3), the column headings, and the filter categories (Vendor, Category, Store #, Inventory, Start Date, and End Date). Sales records of each VendorStyle are illustrated on the left of the screen and Inventory records of each are shown on the right of the screen. Inventory records are displayed with the most Aged inventory on top and sales data is illustrated with the shortest age on top. Accordingly, one may associate retailers that are moving inventory quickly with those who have extensive aged inventory. Thereby symbiotic reprovisioning by VendorStyle may be suggested by the report.

FIG. 7 illustrates a style analysis report configured to show a vendor how each individual product is performing in their customer's stores. This report helps one understand which styles are selling, creating the most profit, and/or are not performing and are now aged inventory. Understanding and acting on this information can significantly impact profitability.

FIG. 8 illustrates a filtered version of the report of FIG. 7. In particular, the report is filtered by price point and retailer (vendor). This permits understanding and/or analysis regarding performance of products at a particular price point at a particular retailer.

FIG. 9 illustrates an unfiltered (except by date) Department Analysis Report configured to show how categories of products are performing.

FIG. 10 illustrates a filtered Department Analysis Report configured to show how categories of products are performing in a specific store location.

FIG. 11 illustrates a Vendor Analysis Report that is unfiltered (except by date) and shows how various customers are performing in a specific category, price point, and date range.

FIG. 12 illustrates a Vendor Analysis Report that is filtered and shows how various customers are performing in a specific category, price point, and date range.

FIG. 13 illustrates a Price Point Analysis Report that is unfiltered (except by date) and shows how price points are performing across store locations.

Figure 14:
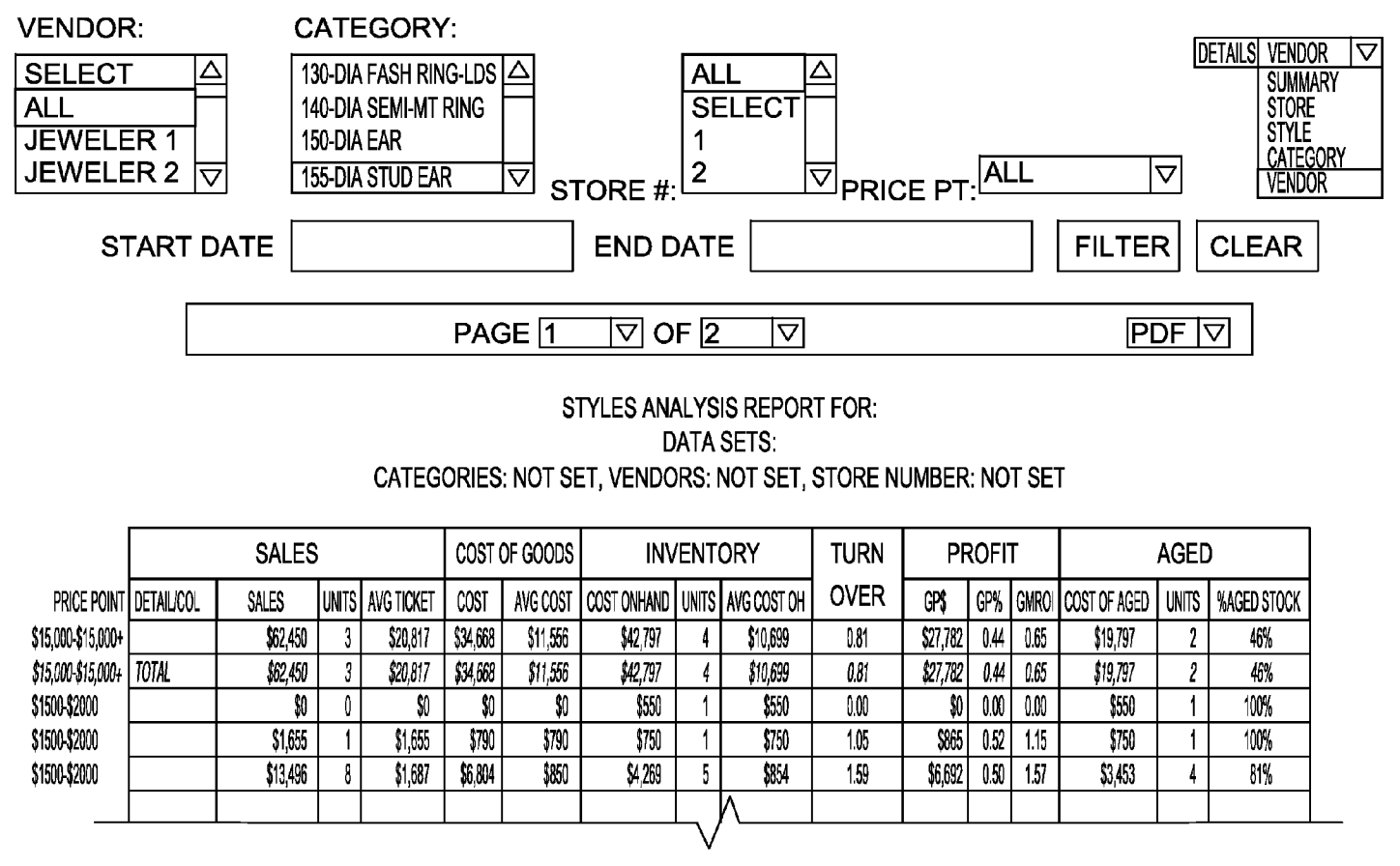

FIG. 14 illustrates a Price Point Analysis Report that is filtered by product category and shows how price points are performing across store locations.

Figure 15:
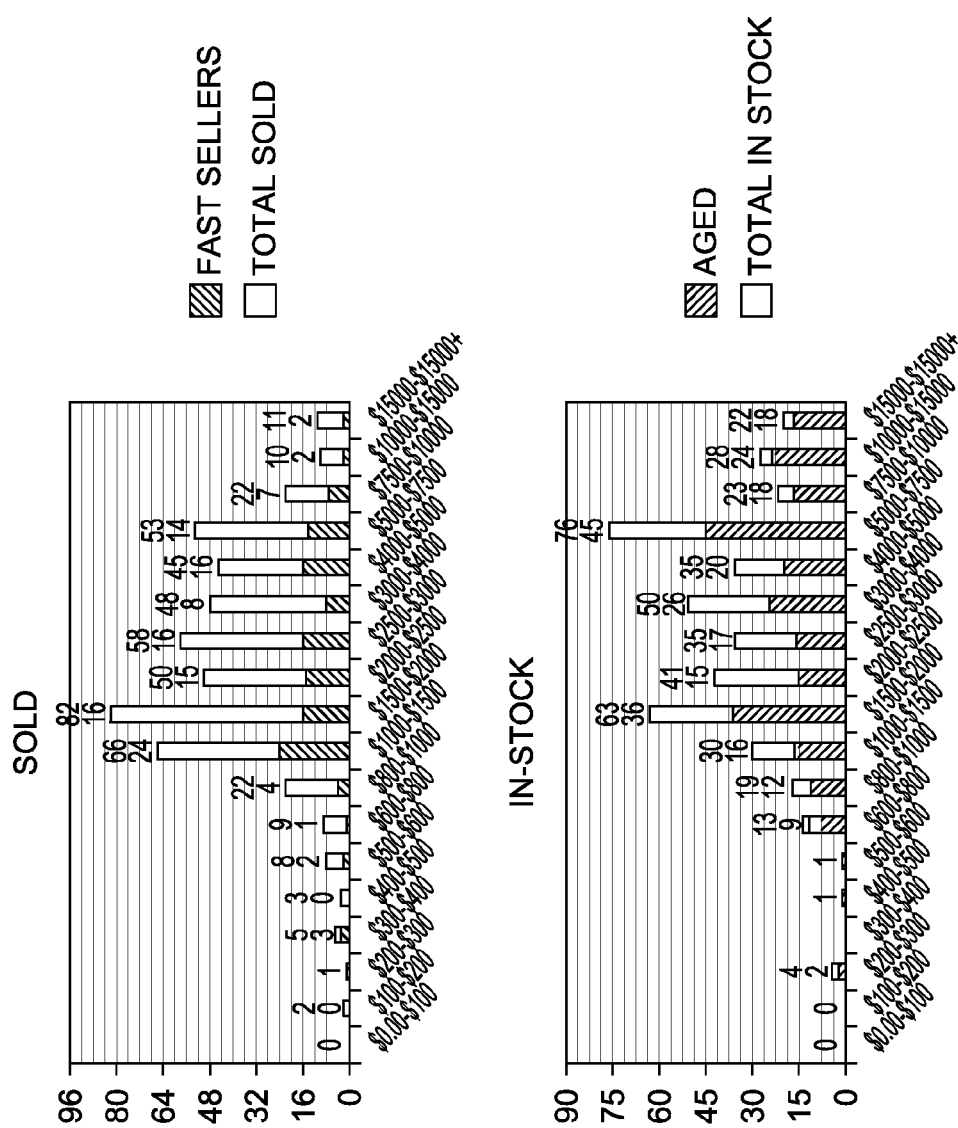

FIG. 15 illustrates a Price Point Chart that provides a visual representation of how a retailer's price point of products are performing in a specific store and category.

FIG. 16 illustrates an Aged Inventory Report filtered by a particular retailer that shows problem areas of aged inventory, thereby allowing proactive reprovisioning.

FIG. 17 illustrates a Fast Sellers Summary Detail Report showing those VendorStyles that are performing well.

FIG. 18 illustrates a filtered (by retailer) Fast Sellers Summary Detail Report showing those VendorStyles that are performing well.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, while particular internet-based dynamic reports are illustrated, it is understood that a great variety of interfaces/platforms may be utilized, including but not limited to other reports, javascript applications, desktop executables, smartphone applications, combinations thereof, and the like.

More, while a particular sequence of steps is illustrated, it is understood that a great variety of alternative sequences may be used in carrying out the invention, including altering the order of the steps, including additional steps, repeating steps, and/or removing illustrated steps.

In particular, it is envisioned at each of the features, functions, benefits, modules, programs, algorithms, methods, steps, and etc. described herein may be utilized in any combination in a system, method, device, apparatus, computer program, signal on a carrier wave, instructions on computer readable media, and the like.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A vendor-based inventory management apparatus configured to facilitate management of retail inventory associated with a vendor using a computing device, comprising:
   a) a communication module in communication with a plurality of remote, point of-sale, (POS) systems over a network such that the communication module is receptive to POS data from a plurality of store locations and including a communication device;
   b) a data storage module in communication with the communication module and including a memory storage device that stores PUS data received through the communication module and including a data storage device in communication with a processor; and
   c) an interface module in communication with the data storage module and that reports comparative historical POS data across a plurality of store locations and including an interface device, wherein the interface module displays data associated with suggested transactions using dynamic reports.

2. The system of claim 1, wherein the interface module displays suggested beneficial transactions including received store location data.

3. The system of claim 2, further comprising a data analysis module in communication with the data storage module, including a computing device and that analyzes data stored therein and suggest beneficial transactions.

4. The system of claim 3, wherein the data analysis module queries the data storage module for POS data by stock keeping unit across a plurality of store locations, to score the received store location data by inventory age, inventory amount, and/or volume, and to sort received store location data by score.

5. The system of claim 4, wherein the data analysis module sorts received store location data into reprovision groups and to calculate expected gains from reprovision permutations between the groups.

6. The system of claim 5, wherein the communication module is in direct communication with contact management module.

7. The system of claim 6, further comprising a contact management module in communication with the data storage module and that manages contact information across a plurality of store locations and associate the same with reported suggested beneficial transactions.

8. A vendor-based inventory management system configured to facilitate management of retailer inventory associated with a vendor using a cloud-based computing service, comprising:
   a) a communication module in communication with a plurality of remote point-of-sale (POS) systems over a network such that the communication module is receptive to POS data from a plurality of remote store locations and including a network communication device;
   b) a data storage module in communication with the communication module and including a memory storage device of a server that stores POS data received through the communication module and responds to queries against the POS data;
   c) an interface module in communication with the data storage module and that dynamically reports comparative historical POS data across a plurality of store locations in a manner accessible to a remote interface device such that the user of a remote interface device is enabled alter a report view and wherein the interface module is receptive to query instructions from a remote interface device; and
   d) a data analysis module in communication with the data storage module, including a processor that analyzes data stored therein and suggest beneficial transactions between store locations that are reported through the interface device.

9. The system of claim 8, wherein the interface module dynamically reports historical POS data for a single store location to a remote interface device.

10. The system of claim 8, further comprising a contact management module in communication with the data storage module and that manages contact information across a plurality of store locations and associate the same with selected suggested beneficial transactions.

11. The system of claim 8, wherein the data analysis module queries the data storage module for POS data by stock keeping unit across a plurality of store locations, to score the received store location data by inventory age, inventory amount, and/or volume, and to sort received store location data by score.

12. The system of claim 8, wherein the data analysis module sorts received store location data into reprovision groups and to calculate expected gains from reprovision permutations between the groups.

13. The system of claim 8, wherein the interface module restricts access to POS data by user account.

* * * * *